(12) United States Patent
Godbole

(10) Patent No.: US 7,730,090 B2
(45) Date of Patent: Jun. 1, 2010

(54) ARCHITECTURE FOR PERFORMING FILE SYSTEM CHECKING ON AN ACTIVE FILE SYSTEM

(75) Inventor: Saurabh Godbole, Pune (IN)

(73) Assignee: EMC Corporation, Hopkinton, MA (US)

( * ) Notice: Subject to any disclaimer, the term of this patent is extended or adjusted under 35 U.S.C. 154(b) by 514 days.

(21) Appl. No.: 11/684,139

(22) Filed: Mar. 9, 2007

(65) Prior Publication Data

US 2008/0222078 A1 Sep. 11, 2008

(51) Int. Cl.
*G06F 17/30* (2006.01)
*G06F 15/16* (2006.01)

(52) U.S. Cl. .................. 707/781; 707/821; 707/822
(58) Field of Classification Search .................. 707/200
See application file for complete search history.

(56) References Cited

U.S. PATENT DOCUMENTS

| | | | | |
|---|---|---|---|---|
| 5,727,206 | A * | 3/1998 | Fish et al. | 707/202 |
| 6,895,413 | B2 * | 5/2005 | Edwards | 707/201 |
| 7,440,966 | B2 * | 10/2008 | Adkins et al. | 707/102 |
| 7,499,959 | B2 * | 3/2009 | Edwards | 707/204 |
| 2004/0107217 | A1 * | 6/2004 | Hastings | 707/104.1 |

OTHER PUBLICATIONS

McKusick, Marshall, "Running 'fsck' in the Background", BSDCon 2002.*
McKusick et al., "Soft Updates: A Technique for Eliminating Most Synchronous Writes in the Fast Filesystem", Proceedings of the FREENIX Track: 1999 USENIX Annual Technical Conference, Jun. 6-11, 1999, The USENIX Assocation, http://www.usenix.org/publications/library/proceedings/usenix99/full_papers/mckusick/mckusick.pdf.*
Schonhorst, Brad, "Evolution of the Unix File System", Spring 2006, http://www.nycbug.org/files/FFS.pdf.*

* cited by examiner

*Primary Examiner*—Tony Mahmoudi
*Assistant Examiner*—Brittany N McCue
(74) *Attorney, Agent, or Firm*—Krishnendu Gupta; Joseph D'Angelo

(57) ABSTRACT

A system and method for performing File System checKing (FSCK) allows a file system to be accessed while the file system is being checked for consistency in the background. In the event that a file is accessed prior to having been checked for consistency by the background FSCK process, the background FSCK process is interrupted, and an in-context FSCK is performed on the accessed file. In addition, an in-context FSCK method and system is described which uses a snapshot block bitmap, FSCK block bitmap and FS block bitmap to check block consistency in the context of handling a block access to handle consistency and corruption issues as part of the file access.

17 Claims, 4 Drawing Sheets

ARCHITECTURE FOR PERFORMING FILE SYSTEM CHECKING ON AN ACTIVE FILE SYSTEM

FIELD OF THE INVENTION

This invention is related generally to the field of file systems and more particularly to a method and apparatus for increasing file server availability by reducing delays associated with checking file system consistency.

BACKGROUND OF THE INVENTION

In network environments where high-availability is a necessity, system administrators are constantly faced with the challenges of preserving data integrity and ensuring availability of critical system components. One critical system component in any computer processing system is its file system. File systems include software programs and data structures which define the use of underlying data storage devices. File systems are responsible for organizing disk sectors into files and directories and keeping track of which sectors belong to which file and which are not being used.

The accuracy and consistency of a file system is necessary to relate applications and data. However, there always exists the potential for data corruption in any computer system and therefore measures are taken to periodically ensure that the file system is consistent and accurate. Currently file server state is periodically backed-up or saved as a file system snapshot to allow system recovery in the event of faults or failures. In the event that data corruption is detected, one of the snapshots can be used for file system recovery.

Each snapshot must be verified for accuracy and consistency prior to storage and/or recovery. File system verification may be performed via a 'file system check' (FSCK) utility. The present FSCK utility takes a monolithic approach; when checking consistency of the file system, the entire file system is un-mounted and scanned completely to identify and repair data structures to provide a consistent snapshot of the file system. A variety of operations are performed during FSCK; for example file system directory structures and block counts are checked for consistency and data values may be checked for accuracy. Because the data structure contents and relationships of the file system are being verified during FSCK, no access is permitted to the file system during the FSCK process.

The amount of time required to execute the FSCK utility is generally time linear to the size of the file system, and therefore can be a time consuming task when the file system is large. For example, it may take as much as 24 hours to perform a file system check on a 16 Terabyte file system. As the size of file systems continues to grow the time required to check the file system becomes an obstacle, greatly hindering the uptime of the file system and adversely affecting the performance of the file server. It would be desirable to identify a system and method capable of providing consistency checks on large file systems while minimizing the disruption in use of the file system caused by the consistency checks.

SUMMARY OF THE INVENTION

According to one aspect of the invention, a method of performing file system checking recognizes that while a file system may be quite large, only a small portion of the files are accessed at any given time. Rather than delay access to a file while the entire file system is checked for consistency, the present invention performs file system checks on each file prior to allowing access to the file. As a result file system consistency can be checked without sacrificing file system availability.

In one embodiment of the invention a FSCK status bitmap is maintained which includes a bit for each file in the file system and indicates whether FSCK has been performed on the file. A background FSCK process checks the consistency of each file in the file system, setting a bit in the FSCK status bitmap corresponding to each file to indicate that the file has been checked and is consistent. With such an arrangement the file system remains available for access by clients while the background FSCK process is executing.

In the event that a file is accessed prior to having been checked for consistency by the background FSCK process, an in-context FSCK thread is generated to perform an in-context FSCK concurrently with the background process on the accessed file. As a result, the delay associated with performing File System Checking (FSCK) on the file system is no longer time-linear to the size of the file system. In contrast, small delays will be incurred only when a file is accessed before the background FSCK process has had the opportunity to FSCK the file. As a result, the amount of time that files are unavailable due to FSCK is drastically reduced, the uptime of the file system is improved and larger file systems may easily be supported.

According to another aspect of the invention, a system for maintaining file system consistency includes a plurality of bitmaps, each bitmap storing an ownership information for each block in the file system, the plurality of bitmaps including a snapshot bitmap for storing block ownership status information at a point in time just before the file system consistency check was initiated, a file system bitmap for storing block ownership statue information as perceived by the file system, and a File System ChecK (FSCK) bitmap for storing block ownership status information as perceived by an FSCK process.

A FSCK process compares ownership block bits associated with an accessed file in each of the snapshot bitmaps, file system bitmaps and FSCK bitmaps for each file to be checked when to verify mapping of blocks to files. Responsive to a state of each of the bits, the FSCK process takes appropriate steps to restore consistency to the file system. According to another aspect of the FSCK process, consistency for file state changes such as changes to access control lists, link counts, file quotas, etc. may be achieved by flushing the file to disk as part of the FSCK process.

BACKGROUND OF THE INVENTION

DETAILED DESCRIPTION

The present invention is directed towards a system, apparatus and method for increasing file server availability by decreasing the amount of time that is used to verify file system accuracy and consistency and concomitantly increase the uptime of the file system. Data structures and processes of the present invention allow the file system to be accessed during the FSCK process by performing File System ChecKing (FSCK) on files that are not currently being accessed using processing cycles as they become available. When a request is made to access a previously un-accessed and unchecked file, an in-context File System ChecKing (FSCK) is performed on the requested file prior to use.

Although the present invention will be described with regard to components of a particular file server and file system architecture, it should be understood that the broad concepts of the present invention which enable file system checking to be performed in the background while the file system is being accessed may easily be adapted for use with any type of file system, for any type of file server architecture. Thus it should be understood that the below embodiments are provided by way of example only, and are not meant to limit the scope of equivalents of the present invention.

Figure 1:
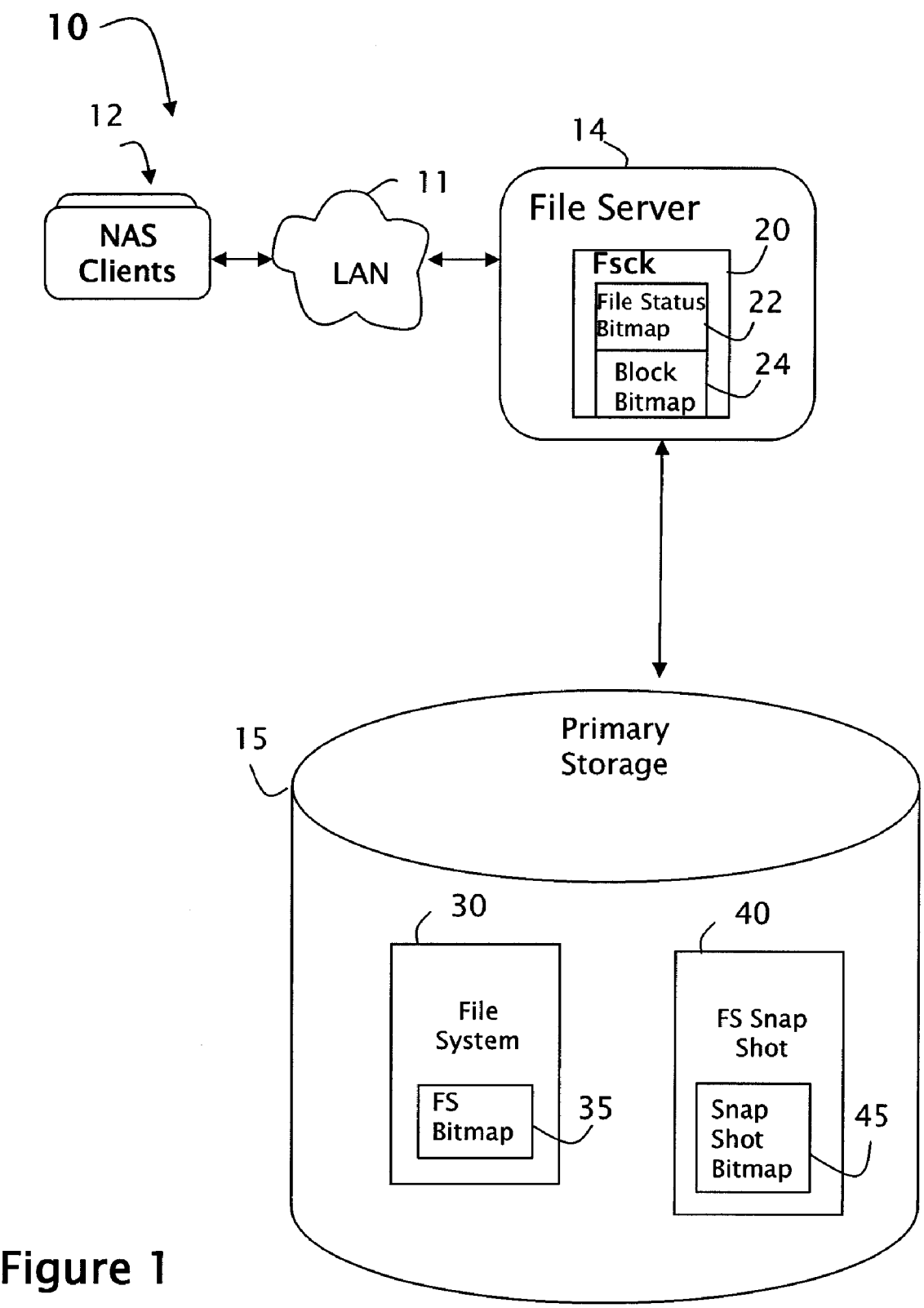
FIG. 1 is a block diagram of a storage system including incremental file system check capabilities of the present invention.

For example, FIG. 1 illustrates an exemplary Network Attached Storage (NAS) system 10 in which the present invention may be employed. One or more NAS clients such as clients 12 and 18 are coupled via a Local Area Network (LAN) 11 to NAS file server 14. File server 14 has its own network address and may be accessed using a variety of network protocols, including but not limited to the Network File System (NFS) protocol of Sun Microsystems™ and the Common Internet File System (CIFS) provided by Microsoft Systems™. An exemplary NAS device that may be used for primary storage 14 is any Celerra product provided by EMC Corporation of Hopkinton Mass.

File server 14 controls the access and retrieval of data from attached storage devices such as primary storage 15. The file server is a computer on which a user can map or mount a drive or directory so that the directory appears to be on the machine at which the user is sitting. Additionally, the user can read or write a file as though it were part of the filesystem of the user's computer.

Figure 2:
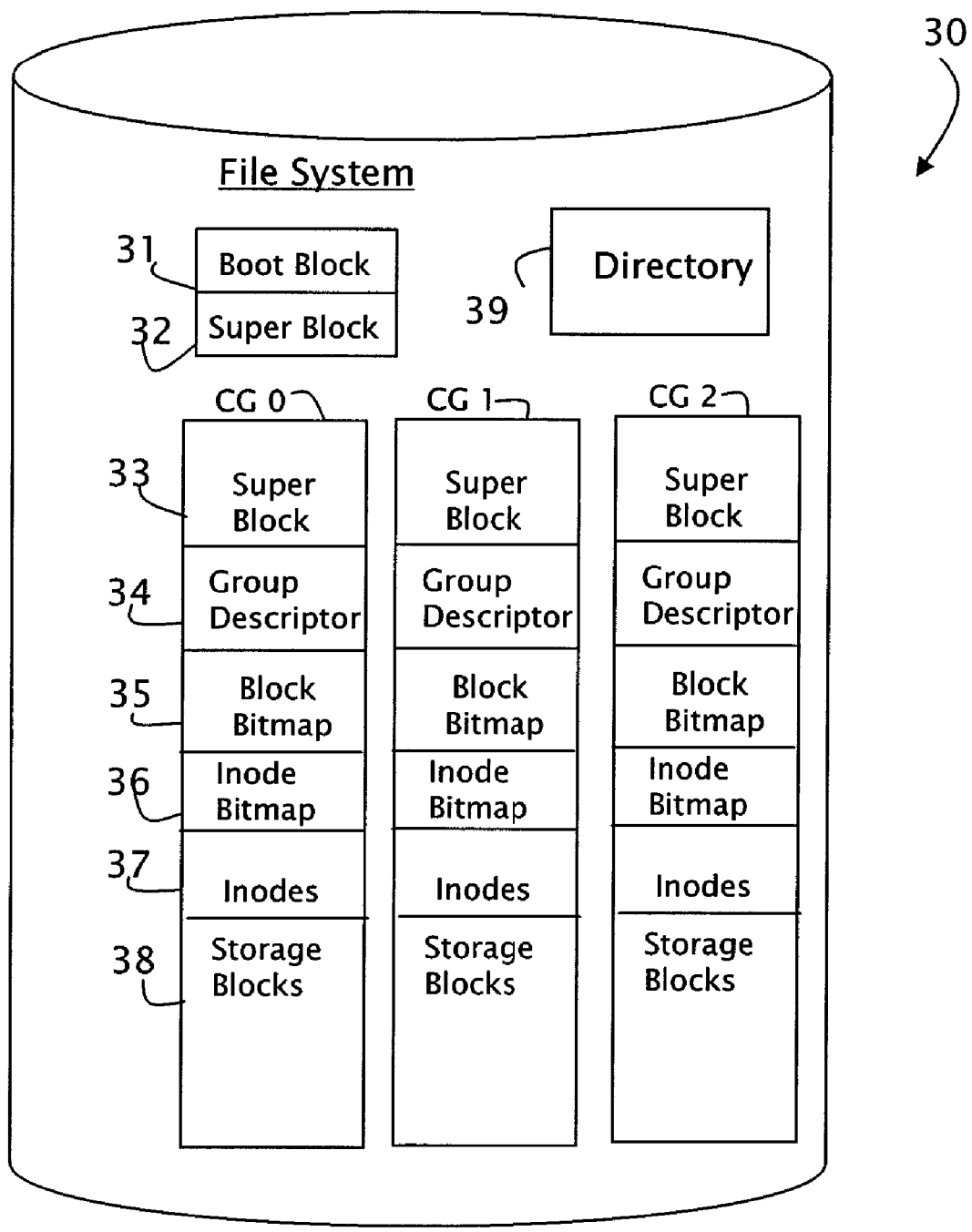
FIG. 2 illustrates exemplary components of a file system.

The filesystem 30 defines the use of data storage devices that offer access to an array of fixed-size blocks, or sectors. The file system software is responsible for organizing these sectors into files and directories, and keeping track of which sectors belong to which file and which are not being used. FIG. 2 illustrates exemplary components of a typical file system in more detail. File system 30 is composed of a group of boot blocks 31, a superblock 32 and a collection of cylinder groups (CGs), such as CG 0, CG 1 and CG2. The boot block stores code which is used to initialize the file system. The superblock stores statistical, geometric and behavioral tuning parameters associated with the file system. Each cylinder group (CG) has the following components: a backup copy of the superblock, a CG descriptor block 34, a block bitmap 35, an Inode bitmap 36, inodes 37 and data blocks 38. The CG descriptor block 34 stores information to the particular cylinder, such as the address of block and inode bitmaps and statistical information regarding cylinder use. The block bitmap 35 includes a bit for each block of data for indicating an in-use indication state for the block. The inode bitmap 36 includes a bit for each inode in the inodes block 37, and provides an in-use indication state for the inode. An inode is a data structure that holds information about files in a UNIX file system. There is an inode for each file and a file is uniquely identified by the file system on which it resides and its inode number on that system.

Referring back to FIG. 1, primary storage may also be used to store one or more snapshots ('snaps') 40 the file system. The snapshot stores file system data at a point in time when the file system was last verified to be consistent. Thus the snapshot includes the same data structures as the file system. As described above, each of the FS and Snapshots include one or more respective block bitmaps 35 and 45, which indicate a use status of associated data blocks.

According to one aspect of the invention, a File System ChecKing (FSCK) process 20 executes on a device coupled to the file system, such as file server 14. The FSCK process can be performed using hardware, software or a combination thereof. Two data structures which are used by the FSCK process include an FSCK file status bitmap 22 and a dedicated FSCK block bitmap 24.

The FSCK file status bitmap 22 includes one bit per file in the file system. Each bit is used to indicate the status of the FSCK process with regard to the associated file. In an embodiment where a UNIX file system is being checked, the bitmap may include a bit for each inode in the file system. In one embodiment, a bit is set to indicate that FSCK has been performed on file, and cleared to indicate when FSCK has not been performed on the file. Alternatively, bits may be cleared to indicate that FSCK has been performed, and set when FSCK has not yet been performed for the block.

The FSCK block bitmap 24 includes one bit for each block in the file system and is used to identify whether the block is owned by a file. As will be described with regard to FIG. 4, the FSCK block bitmap 24 is used in conjunction with the Snapshot block bitmap 45 and the FS block bitmap 35 to identify and resolve ownership consistency issues with the file system.

Figure 3:
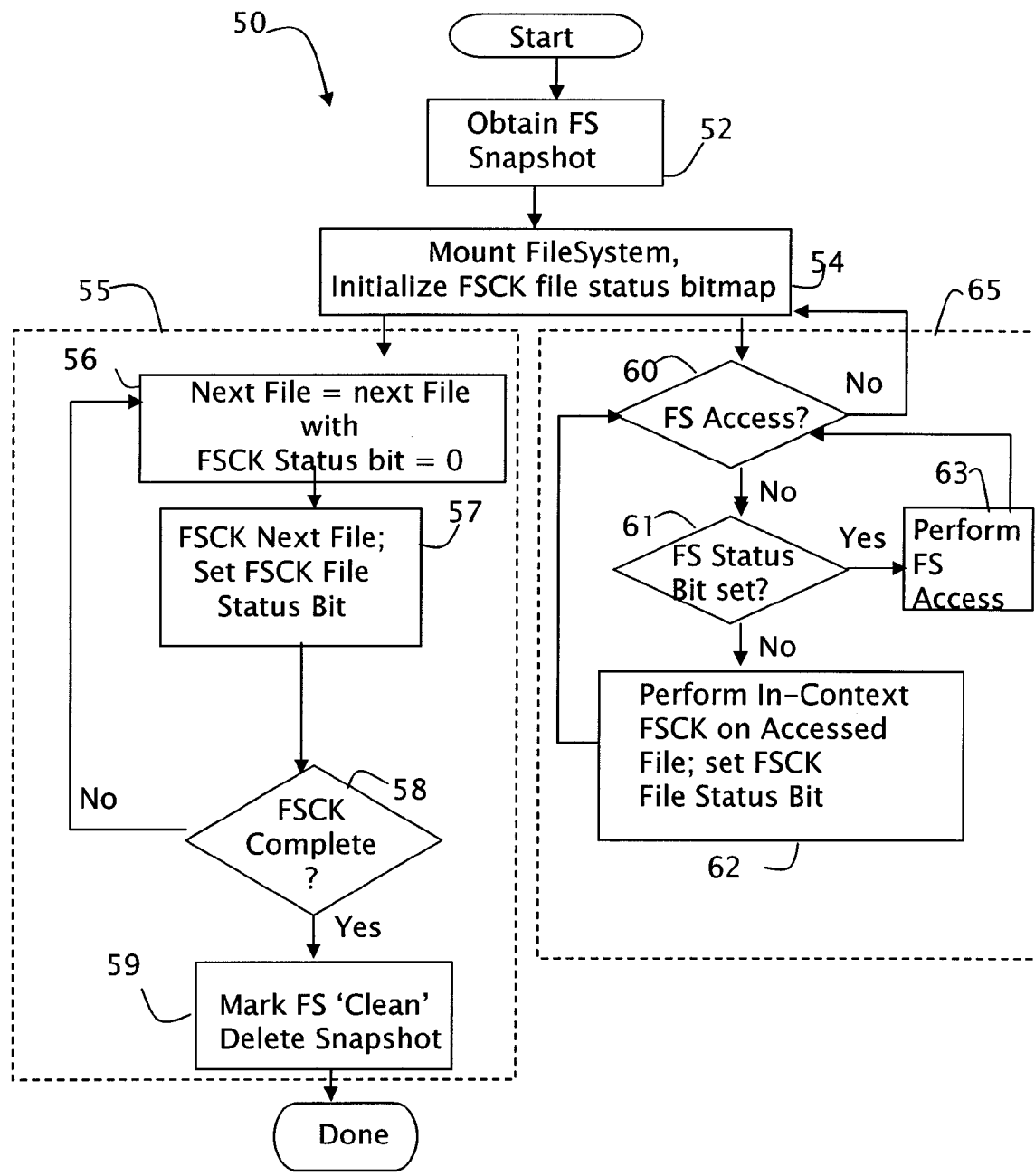
FIG. 3 is a flow diagram illustrating various steps that may be performed by a FSCK process of the present invention.

FIG. 3 illustrates exemplary steps that may be performed in a process 50 for selecting files for file checking. At step 52 a point in time view, or snapshot, of the file system is obtained.

At step 54 the file system is mounted and the FSCK block bitmap is initialized to indicate that no files have yet been checked. Two processes may be operating in parallel; a background FSCK 55 and an in-context FSCK process 65. At step 56 the process of background FSCK scanning 55 begins. In one embodiment the file system is scanned in sequential block order by identifying the next file status bit in the bitmap which indicates that FSCK has not yet been performed on the file. However the present invention is not limited to checking files in the background in any particular order, and it is appreciated that other methods of identifying the next file may be considered equivalents hereto. At step 57, upon completion of background FSCK for each of the files the associated FSCK file status bit is set in the FSCK file status bitmap. The background FSCK process continues until it is determined at step 58 that all bits in the FSCK file status bitmap are set. At step 59 the file system is then marked 'clean' and the snapshot may be deleted.

In the in-context FSCK process 65, when a file access is detected at step 60 an in-context FSCK thread is spawned to perform FSCK on the file being accessed. By 'in-context' it is meant that the FSCK become part of the file system access; failure to successfully FSCK will result in failure of access for the file. At step 61 the FSCK file status bitmap is first checked to see if an FSCK has already been performed on the file; if so, then the FS access is allowed to proceed at step 63. If not, then an in-context FSCK is performed at step 62. Upon completion of the FSCK access, the FSCK file status bit associated with the accessed file is set, and the process returns to step 60 to await the next FS access.

It should be noted that although FIG. 3 illustrates serial background and in-context FSCK processes, the serial representation has been provided for clarity purposes only. In fact, in-context and background FSCK may be performed on any number of files in parallel. The number of files that can be checked in parallel depends only upon the available system resources.

As mentioned above, the background and in-context FSCK processes continue until all the bits in the FSCK file status bitmap indicate that all files have been FSCK'd and the file system is marked 'clean.' At this point the original snapshot can be deleted. At periodic intervals the 'clean' file system may be stored as a snapshot.

In one embodiment, the once the file system has reached a 'clean' state, no further FSCK operations need be performed. It is envisioned that, in some embodiments the FSCK operation may be repeated at intervals in response to a triggering event. The triggering event may be a time period, or it may be the detection of a potential corruption or coherency issue. The entire file system may be checked, or select portions of the file system may be checked by appropriately setting bits in the FSCK file status bitmap. In still an alternate embodiment, the FSCK process continues to monitor file accesses and perform in-context file system checks for each access. Accordingly a process has been shown and describes that enables FSCK to be performed on an active file system. With such an arrangement, the time required for FSCK a file system can be reduced to seconds, irrespective of the file system size, file size or reason for corruption. It should be noted that any type of FSCK may be performed on the files that are identified by the process of FIG. 3, and although a preferred in-context FSCK process will now be described with regard to FIG. 4, the present invention is not limited to the use of the particular FSCK process described in FIG. 4 in the file identification and handling method of FIG. 3.

According to another aspect of the invention, a FSCK process that may be used to perform background and in-context FSCK on files will now be described. The FSCK process of the present invention allows corruption to be detected and consistency restored in the face of fundamental problems such as the changing state of the file system. According to one aspect of the invention, the FSCK process uses the FSCK block bitmap 24, FS block bitmap 35 and Snapshot block bitmap 45 to identify and repair potential file corruption issues.

Figure 4:
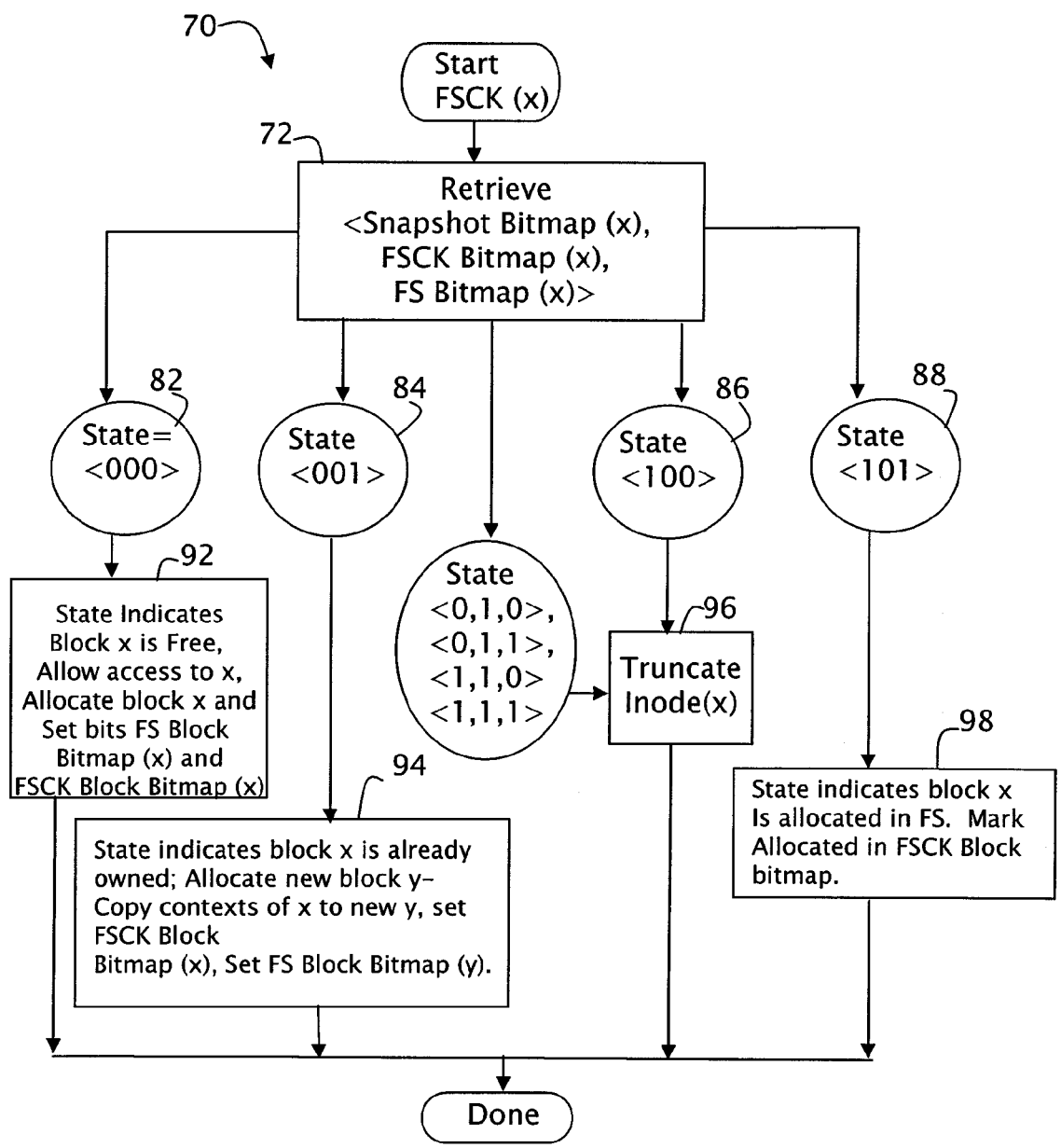
FIG. 4 is a state/flow diagram provided to illustrate various states of a FSCK block allocation checking process and the resultant processes that are used to attain file system coherence in background FSCK process or part of an in-context FSCK process.

For example, FIG. 4 is a state/flow diagram that illustrate an FSCK block allocation checking process that can be used to identify erroneously allocated blocks, and thereby prevent a new file access from over-writing a data block that belongs to another file. In the diagram of FIG. 4, the allocation status of block 'x' in the file system is being checked in response to an access to a file that includes block x, where the access may be a client access or access by the background FSCK process. Note that the process of FIG. 4 should be executed for each block in each FSCK'd file before the FSCK file status bit is set to indicate that the file is FSCK'd.

At step 72 the bit associated with block x is extracted from each of the snapshot block bitmap 45, FSCK block bitmap 24 and FS block bitmap 25. In one embodiment, the bits are concatenated into a 3-bit state vector, having state values ranging from <000> to <111>. In one embodiment an FSCK state machine interprets the vector as shown in FIG. 4. For example, in response to an access request for block x, state <000> indicates that the block is viewed as free in each of the snapshot, FSCK bitmap and FS bitmap. If the access is a new file access, the bits in the FSCK and FS bitmap are then set to indicate that the block is allocated to the new file.

When the bits from the snapshot, FSCK and FS bitmaps concatenate to state <001> (84), this indicates that the file was not allocated when it was last 'clean' (i.e., when the system came up from a failure), and the FSCK bitmap does not think that the block is allocated, but the file system has allocated the block to another file. For example, during a request for access to a file F1 it is discovered that the file is not yet checked, so an in-context FSCK is begun for file F1. Scanning the inode indicates that file F1 claims block x as its own, and the state of the block (across the snapshot bitmap, FSCK bitmap and FS bitmap) is 001. This indicates that the block was rightfully owned by file F1, but became allocated to another Unknown File (UF).

In such a scenario it is important that the data in block x not be over-written by the UF. The contents of block x can be found in the snapshot. In one embodiment, to remedy this situation, at step 94 the contents of block x in the snapshot are moved to a newly allocated block y. The inode for F1 is updated to point to block y, and block x remains allocated to the Unknown File. FS block bitmap (x) and FSCK block bitmap (x) are both set to 1. FS block bitmap (y) is set to 1, while FSCK bitmap (y) is set to zero.

States <010>, <011>, <110>, <111> each indicate that block (x) has already been allocated, (due to FSCK block bitmap=1) and that the block would be shared if access was allowed. Access to the block is disallowed and the inode is truncated.

State <100> indicates that the block was allocated when the system was last 'clean', but it does not appear to be owned by the file system. Such a situation is an error and must be remedied. An access to this block should be disallowed and error condition signaled.

State <101> shows that the block was allocated when the file system was last clean, the file system believes it to be allocated, but the FSCK block bitmap has not been set. At step 98 the FSCK block bitmap is set to indicate that the file is already allocated, and the access is allowed.

Accordingly a method and system for controlling the selection and checking of files in an active file system has been shown and described which uses a FSCK file status bitmap to identify file system files for checking, and for tracking the progress of the FSCK process. In addition, a method for performing in-context file system checking has been described that incorporates the file checking process into the handling of a file system access request in a manner that ensures that block allocation consistency is maintained.

It is appreciated that file system checking involves more than verifying the accuracy of block ownership for files. For example, other fundamental problems include verifying the link number of an inode and the access control lists. In one embodiment, the in-context FSCK process advantageously flushes an inode to a disk prior to setting the FSCK file status bit in the FSCK file status bitmap, to ensure that such structures as the link count field and access control lists remain consistent.

Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method of performing file system checking on a file system comprising a plurality of blocks includes the steps of:
   obtaining and maintaining a snapshot block bitmap including a bit for each block in the file system, the bit indicating an ownership state of the block at a point in time associated with a snapshot of the file system;
   obtaining and maintaining a File System ChecKing (FSCK) block bitmap including a bit for each block in the file system, the bit indicating an ownership state of the block as viewed by a FSCK process;
   obtaining and maintaining a File System (FS) block bitmap including a bit for each block in the file system, the bit indicating an ownership state of the block as viewed by the file system; and
   responsive to an access request for a file in the file system, examining bits associated with blocks of the file in each of the snapshot block bitmaps, FSCK block bitmaps and FS bitmaps to determine whether to allow the access to the file;
   wherein the step of examining bits associated with the block in the file in each of the snapshot block bitmaps, FSCK block bitmaps and FS bitmaps includes the steps of concatenating a snapshot bit, FSCK bit, and FS bit to provide a state and performing an operation in response to the state.

2. The method of claim 1, wherein the step of determining whether to allow the access to the file includes the steps of adjusting mappings of files to blocks to prevent data corruption.

3. The method of claim 1 wherein the state is <000> and the operation is to set the FSCK bit to one.

4. The method of claim 1 wherein the state is <001> and the operation includes the steps of:
   allocating a new block;
   copying data from a snapshot block in the snapshot associated with the block to the new block; setting the FSCK bit to one; and
   setting a FS bit associated with the new block to one.

5. The method of claim 1 wherein the FSCK bit is one and the operation is to truncate an inode associated with the file.

6. The method of claim 1 wherein the state is <100> and the operation is to signal an error and truncate an inode associated with the file.

7. The method of claim 1 wherein the state is <101> and the operation is to set the FSCK bit to one.

8. The method of claim 1 wherein the access is a file system check access.

9. The method of claim 1 wherein the access is an access issued by a client for access to the file system.

10. A system comprising:
    means for storing a file system having a plurality of files, the file system including a file system block bitmap including a bit for each block in the file system, the bit indicating an ownership state of the block as viewed by the file system;
    means for storing a snapshot of the file system, the snapshot including a snapshot block bitmap including a bit for each block in the file system, the bit indicating an ownership state of the block at a point in time associated with the snapshot of the file system;
    means for storing a File System ChecKing (FSCK) block bitmap including a bit for each block in the file system, the bit indicating an ownership state of the block as viewed by a FSCK process;
    a computer readable medium having program code stored thereon, the program code being operable in response to an access request for a file in the file system to examine bits associated with the file in each of the snapshot block bitmaps, FSCK block bitmaps and FS bitmaps and to determine whether to allow the access to the file;
    wherein the examination concatenates a snapshot bit, FSCK bit, and FS bit to provide a state and performing an operation in response to the state.

11. The system of claim 10 wherein the state is <000> and the operation is to set the FSCK bit to one.

12. The system of claim 10 wherein the state is <001> and the operation includes the steps of:
    allocating a new block;
    copying data from a snapshot block in the snapshot associated with the block to the new block;
    setting the FSCK bit to one; and
    setting a FS bit associated with the new block to one.

13. The system of claim 10 wherein the FSCK bit is one and the operation is to truncate an inode associated with the file.

14. The system of claim 10 wherein the state is <100> and the operation is to signal an error and truncate an inode associated with the file.

15. The system of claim 10 wherein the state is <101> and the operation is to set the FSCK bit to one.

16. The system of claim 10 wherein the access is a file system check access.

17. The system of claim 10 wherein the access is a file system access initiated by a client.

* * * * *